United States Patent Office 3,163,619
Patented Dec. 29, 1964

3,163,619
PROCESS FOR STABILIZING AND STORING AQUEOUS SOLUTIONS OF POLYACRYLAMIDE
George F. Sheats and William F. Linke, Stamford, Conn., assignors to American Cyanamid Company, New York, N.Y., a corporation of Maine
No Drawing. Filed Mar. 8, 1961, Ser. No. 94,144
10 Claims. (Cl. 260—29.6)

This invention relates to a novel process for stabilizing aqueous solutions of high molecular weight polyacrylamide against viscosity degradation. More particularly, this invention relates to a novel process for inhibiting acidified aqueous solutions of high molecular weight polyacrylamide from viscosity degradation.

One of the objects of the present invention is to inhibit viscosity degradation of aqueous solutions of high molecular weight polyacryclamide. A further object of the present invention is to inhibit viscosity degradation of acidified aqueous solutions of polyacrylamide. These and other objects of the present invention will be discussed in greater detail hereinbelow.

Polyacrylamide is soluble in water and is available in a wide range of molecular weights. Some of these polymers have molecular weights of just a few thousand although others have molecular weights of 50,000; 100,000; 1 million and on up. By comparison, these latter are relatively low molecular weight materials and their aqueous solutions do not pose the same problems with respect to stability during storage as do those polymeric solutions which have molecular weights in excess of about 2 million. The aqueous solutions of polyacrylamide having molecular weights of about 2 million and greater tend to undergo a degradation in viscosity during storage at room temperature (25° C.). The exact mechanism within th polymer molecule itself or within the aqueous solution of the ploymers is not completely understood but it is believed that the viscosity degradation is due, at least in part, to a breaking up of the exceeding long polymeric chains thus resulting in an aqueous solution of polyacrylamide having a molecular weight significantly below the molecular weight of the original polymeric material. The concept of the present invention is then applicable to those polymers having a molecular weight in excess of 2 million and preferably in excess of 6 million such as molecular weights of 20 million up to 40 million and even higher such as hundreds of millions. These high molecular weights may be determined by the light scattering method as outlined in the "Principles of Polymer Chemistry," P. J. Flory, Cornell University Press, 1953, pages 256–316. These molecular weight determinations by the light scattering method are generally referred to as weight average molecular weight. In the production of these high molecular weight polymeric materials, it is hypothesized that if the polymer chain contained nothing but carbon to carbon linkages along the main line of the linear polymer that such a polymeric material would be far less susceptible to this viscosity degradation and possible breakdown of the molecule than if a polymer chain contained random points of oxygen or nitrogen linkages. It is further hypothesized that these random points of oxygen linkages are more susceptible to degradation at these points and are therefore suspected of being responsible, at least in part, for this shortcoming.

The aqueous solutions of the polyacrylamide used in the present invention are exceedingly viscous materials even at low solids content. These solutions have been described as gel-like materials but are stirrable and pumpable. The solids content, of these polymers in aqueous solution to which the instant invention is directed, may be varied over a comparatively narrow range such as between about 0.001% and 5% by weight based on the total weight of polymer and solvent (water). It is preferred to apply the concept of the present invention to those aqueous polymeric solutions having a solids content varying between about .01% and 2% by weight, same basis. Intermediate values such as 0.1%, 0.5% or 3% and 4% will be advantageously treated by the process of the present invention depending upon the particular end use to which these polymeric solutions are to be put. These polymeric solutions to which the instant invention is applicable have already been found to be useful for a plurality of commercial utilizations such as water flooding of oil wells, soil stabilization, paper treating and sewage treatment among many others.

The concept of the present invention is directed then to those aqueous solutions described hereinabove. Certain of the solutions contain acidic material either as a result of the acid type catalyst used in the preparation of the polymers or become acidified in a particular use such as in the treatment of soil or earthen materials which are naturally acidic. By acidic aqueous solutions of polyacrylamide it is meant a solution having a pH below 7 and generally below 4. To these aqueous solutions, whether acidified or not, there is added comparatively small quantities of a non-solvent. The non-solvent may be any one of a plurality of materials in which the polyacrylamide is substantially insoluble. Still further, said non-solvent must be at least partially soluble in water and may even be miscible with water. Still further, the non-solvent should be inert to the polyacrylamide inasmuch as said non-solvent should not enter into any reaction with said polymeric material nor alter its chemical properties in any way. These non-solvents are all volatile materials that leave no residue on evaporation. These non-solvents, furthermore are non-corrosive to metals and do not effect pH values. Among the precipitating agents which may be used in the practice of the process of the present invention are the ketones such as acetone, methylethyl ketone, diethyl ketone, or the aliphatic monohydric alcohols such as methanol, ethanol, propanol, isopropanol, n-butanol, isobutanol, tertiary butanol and the like, dioxane, morpholine and the like. Additionally, one may use glycols such as ethylene glycol, propylene glycol, butylene glycol, diethylene glycol, dipropylene glycol and the like, or glycol mono and/or diethers, such as ethylene glycol monoethyl ether, ethylene glycol monobutyl ether, ethylene glycol monomethyl ether, diethylene glycol monoethyl ether, ethylene glycol diethyl ether, diethylene glycol dimethyl ether, or the glycol ether esters such as ethylene glycol monomethylether acetate and the like. The amount of non-solvent utilized may be varied from about 0.1% to about 25% and preferably from about 1% to about 5% by weight based on the total weight of the polymer and its solvent.

The mode of addition of the non-solvent to the polymer solution requires only addition of the non-solvent followed by or coupled with a thorough blending of the non-solvent with the polymeric solution. Sufficient caution should be exercised in this blending operation to avoid any mechanical degradation or breakdown of the polymer chains which could happen if the stirring is too violent. It is therefore recommended that gentle stirring be utilized to accomplish substantially complete dispersion of the non-solvent into the polymeric solution. Care must also be exercised in the amount of non-solvent utilized as quantities significantly in excess of 25% by weight of non-solvent based on the total weight of polymer and solvent can result in precipitation of the polymeric material from solution and this precipitation should be avoided in the practice of the process of the present invention. The concept of the present invention is best carried out at about room temperature although temperatures below room temperature such as 0° C. and higher temperatures such as 50° C. may be utilized. Atmospheric pressure is most suitable for practicing the concept of the present invention although subatmospheric and superatmospheric pressures may be used.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case exececpt as is indicated in the appended claims.

EXAMPLE 1

An aqueous solution of polyacrylamide is prepared wherein the polyacrylamide has a weight average molecular weight of about 20 million as measured by the light scattering method referred to hereinabove. The concentration of the polyacrylamide in solution is 0.2% (solids). Sufficient HCl is then added to make the solution 0.025 molar in HCl. The solution is divided into 5 substantially equal portions. The first sample is held as a control while each of the remaining 4 are modified by the addition of 1%, 5%, 12.5% and 25.0% of methanol respectively. The treated solutions are each thoroughly but gently stirred so as to make uniform dispersion of the methanol therethrough. The samples are then stored at room temperature for a plurality of days and the percentages of loss in intrinsic viscosity are determined. The results are shown in the following table.

Table I

|   | Age of Solution, Days | Percent Loss in Intrinsic Viscosity [1] |
|---|---|---|
| 1 | 22 | 27.8 |
| 2 | 22 | 6.4 |
| 3 | 16 | 0 |
| 4 | 16 | 3.5 |
| 5 | 16 | 5.2 |

[1] Intrinsic viscosity is represented by [η]

EXAMPLE 2

Example 1 is repeated in all details except that the solids content of polymer is 0.1% and no acid is added. The sample is divided into 3 equal parts, the first is held as a control and the remaining 2 are modified by the addition of 5% of methanol and 5% of ethanol respectively. The non-solvents are blended thoroughly as before. The modified solutions and the control are left to stand at room temperature for 27 days. The control displayed a loss of 3.4% in viscosity while the sample with the methanol had displayed a loss of only 0.5% and the ethanol a loss of 0.8%.

EXAMPLE 3

Example 2 was repeated in all details except there is added to each of the samples including the control 0.1 molar HCl. Upon thorough blending as before, the samples are stored for 28 days. The control shows a loss in intrinsic viscosity amounting to 9.6% while the methanol sample shows a loss of only 2.0% and the ethanol sample a loss of 2.3%.

EXAMPLE 4

An aqueous solution of polyacrylamide, wherein the polyacrylamide has a weight average molecular weight of 10 million as determined by the light scattering method in a concentration of 0.1% solids and containing 0.1 molar HCl is divided into 3 portions. The first is held as a control, the second and third samples are modified by the addition of 5% of methanol and 5% of secondary butanol respectively. On thorough gentle blending as before, the solutions are stored for 35, 27 and 35 days respectively and display the following losses in viscosity: control— 9.6%, methanol sample—4.3%, and secondary butanol sample—4.8%.

EXAMPLE 5

An aqueous solution of polyacrylamide is prepared that had a weight average molecular weight of 6 million as determined by the light scattering method and is broken down into 4 samples. The modification of each sample, its storage time at room temperature and its viscosity loss in percentages are shown in Table II.

Table II

| Percent Non-Solvent Added | Days, Age of Solution | Percent Loss in Viscosity of Solution |
|---|---|---|
| None | 31 | 10.8 |
| 0.1 methanol | 31 | 2.9 |
| 1.0 methanol | 31 | 1.1 |
| 10 methanol | 31 | 1.5 |

EXAMPLE 6

Example 5 is repeated in all details except that to each sample including the control there is added 0.1 molar HCl. The results are shown in Table III.

Table III

| Percent Non-Solvent Added | Days | Percent Loss in Viscosity of Solution |
|---|---|---|
| None | 31 | 6.5 |
| 0.1 methanol | 31 | 5.9 |
| 1.0 methanol | 31 | 3.9 |
| 10.0 methanol | 31 | 3.9 |

The polyacrylamide solutions used as starting materials in the practice of the process of the present invention and the processes of preparing such starting materials are disclosed in a plurality of published references.

Attention is directed particularly to U.S. Patents 2,820,777; 2,875,047 and the article appearing in the Journal of the American Chemical Soc., vol. 79, dated February 5, 1957, pages 595–598 entitled "Dye Sensitised Photopolymerization of Acrylamide" by Oster et al.

We claim:

1. A process for stabilizing and storing aqueous solutions of polyacrylamide so as to inhibit viscosity degradation during storage comprising blending from about 0.1% to about 25% by weight of a non-solvent with an aqueous solution of polyacrylamide having a molecular weight of at least about 2 million and storing said solution while in the stabilized condition for a plurality of days, said solution having a solids content of polyacrylamide of between about 0.001% and 5% by weight, wherein said percentages are percentages by weight based on the total weight of said solution and wherein said non-solvent is at least partially soluble in water, is inert to said polymer and said polymer is substantially insoluble therein.

2. A process for stabilizing and storing aqueous solutions of polyacrylamide so as to inhibit viscosity degradation during storage comprising blending from about 1% to about 5% by weight of a non-solvent with an aqueous solution of polyacrylamide having a molecular weight of from about 20 million to about 40 million and storing said solution while in the stabilized condition for a plurality of days, said solution having a solids content of polyacrylamide of between about .01% and 2% by weight, wherein said percentages are percentages by weight based on the total weight of said solution and wherein said non-solvent is at least partially soluble in water, is inert to said polymer and said polymer is substantially insoluble therein.

3. A process for stabilizing and storing aqueous solutions of polyacrylamide so as to inhibit viscosity degradation during storage comprising blending from about 1% to about 5% by weight of methanol with an aqueous solution of polyacrylamide having a molecular weight of from about 20 million to about 40 million and storing said solution while in the stabilized condition for a plurality of days, said solution having a solids content of polyacrylamide of between about .01% and 2% by weight, wherein said percentages are percentages by weight based on the total weight of said solution.

4. A process for stabilizing and storing aqueous solutions of polyacrylamide so as to inhibit viscosity degradation during storage comprising blending from about 1% to about 5% by weight of ethanol with an aqueous solution of polyacrylamide having a molecular weight of from about 20 million to about 40 million and storing said solution while in the stabilized condition for a plurality of days, said solution having a solids content of polyacrylamide of between about 0.1% and 2% by weight, wherein said percentages are percentages by weight based on the total weight of said solution.

5. A process for stabilizing and storing aqeuous solutions of polyacrylamide so as to inhibit viscosity degradation during storage comprising blending from about 1% to about 5% by weight of isobutyl alcohol with an aqueous solution of polyacrylamide having a molecular weight of from about 20 to about 40 million and storing said solution while in the stabilized condition for a plurality of days, said solution having a solids content of polyacrylamide of between about .01% and 2% by weight, wherein said percentages are percentages by weight based on the total weight of said solution.

6. A process for stabilizing and storing aqueous solutions of polyacrylamide so as to inhibit viscosity degradation during storage comprising blending from about 0.1% to about 25% by weight of a non-solvent with an acidified aqueous solution of polyacrylamide having a molecular weight of at least about 2 million and storing said solution while in the stabilized condition for a plurality of days, said solution having a solids content of polyacrylamide of between about 0.001% and 5% by weight, wherein said percentages are percentages by weight based on the total weight of said solution and wherein said non-solvent is at least partially soluble in water, is inert to said polymer and said polymer is substantially insoluble therein.

7. A process for stabilizing and storing aqueous solutions of polyacrylamide so as to inhibit viscosity degradation during storage comprising blending from about 1% to about 5% by weight of a non-solvent with an acidified aqueous solution of polyacrylamide having a molecular weight of from about 20 million to about 40 million and storing said solution while in the stabilized condition for a plurality of days, said solution having a solids content of polyacrylamide of between about .01% and 2% by weight, wherein said percentages are percentages by weight based on the total weight of said solution and wherein said non-solvent is at least paritally soluble in water, inert to said polymer and said polymer is substantially insoluble therein.

8. A process for stabilizing and storing aqueous solutions of polyacrylamide so as to inhibit viscosity degradation during storage comprising blending from about 1% to about 5% by weight of methanol with an acidified aqueous solution of polyacrylamide having a molecular weight of from about 20 million to about 40 million and storing said solution while in the stabilized condition for a plurailty of days, said solution having a solids content of polyacrylamide of between about .01% and 2% by weight, wherein said percentages are percentages by weight based on the total weight of said solution.

9. A process for stabilizing and storing aqueous solutions of polyacrylamide so as to inhibit viscosity degradation during storage comprising blending from about 1% to about 5% by weight of ethanol with an acidified aqueous solution of polyacrylamide having a molecular weight of from about 20 million to about 40 million and storing said solution while in the stabilized condition for a plurality of days, said solution having a solids content of polyacrylamide of between about .01% and 2% by weight, wherein said percentages are percentages by weight based on the total weight of said solution.

10. A process for stabilizing and storing aqueous solutions of polyacrylamide so as to inhibit viscosity degradation during storage comprising blending from about 1% to about 5% by weight of isobutyl alcohol with an acidified aqeuous solution of polyacrylamide having a molecular weight of from about 20 million to about 40 million and storing said solution while in the stabilized condition for a plurality of days, said solution having a solids content of polyacrylamide of between about .01% and 2% by weight, wherein said percentages are percentages by weight based on the total weight of said solution.

References Cited in the file of this patent

UNITED STATES PATENTS

| | | |
|---|---|---|
| 2,876,205 | Lighthipe et al. | Mar. 3, 1959 |
| 3,001,949 | Hansen | Sept. 26, 1961 |
| 3,046,259 | Hess et al. | July 24, 1962 |

FOREIGN PATENTS

| | | |
|---|---|---|
| 841,279 | Great Britain | July 13, 1960 |